Feb. 15, 1944. H. J. KERR Re. 22,436

PRESSURE VESSEL

Original Filed May 25, 1937

INVENTOR.
Howard J. Kerr
BY
Paul R. Jones
ATTORNEY.

Reissued Feb. 15, 1944

Re. 22,436

UNITED STATES PATENT OFFICE 22,436

PRESSURE VESSEL

Howard J. Kerr, Westfield, N. J., assignor to The Babcock & Wilcox Company, Newark, N. J., a corporation of New Jersey Original No. 2,183,043, dated December 12, 1939, Serial No. 144,755, May 25, 1937. Application for reissue November 29, 1941, Serial No. 421,028

6 Claims. (Cl. 148—4)

This invention is a pressure vessel and method of forming the same with tubular welded connections irrespective of a wide difference in thickness dimension of the wall of the tube with respect to that of the wall of the vessel to which the tube is joined.

The difficulties attendant upon joining metals of different thickness by fusion welding are too well known to need detail statement herein. The problem solved by the present invention is that of joining a thin wall tube to a thicker wall pressure vessel with a depth of fusion welded juncture adequate for the strength of the union but without danger of impairing the strength of the tube wall should any non-uniformity exist in the region of the weld juncture between tube and vessel wall.

A further feature of the invention resides in so forming the union between the tube and vessel wall that the tube wall sustains the internal pressure without imposing any appreciable pressure load upon the weld.

Additionally the invention provides for satisfactorily accomplishing a field welded joint between a tube and vessel of dissimilar metals where the metals are such that it would be difficult, unsatisfactory and expensive to perform the joining of such metals in the field.

A still further advantage of the present invention is that where the tubes and vessel structure are used with high temperature fluids, such as superheated steam, for instance, conveyed to the vessel by the tubes, the conductivity of the juncture is such that sudden changes in temperature, which might otherwise tend to impair the permanency of the joint, is minimized.

With the foregoing and other objects in mind I will now describe practical embodiments of my invention which I have illustrated in the accompanying drawing forming a part of this specification and wherein—

Figure 1:
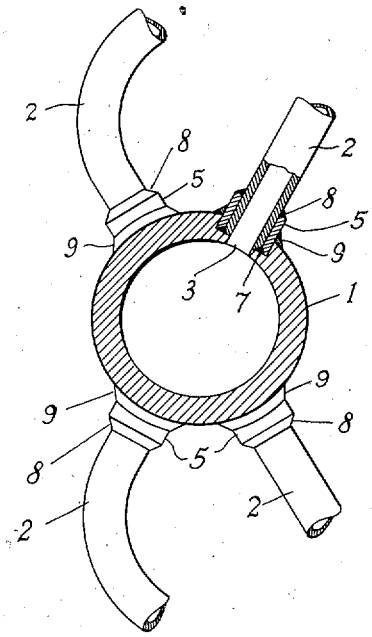
Fig. 1 is a transverse section through a pressure vessel having a number of tubes joined therewith.

In the invention as shown in Fig.1, the disclosure takes the form of a superheater header for steam generators and wherein the superheated steam is received into the header 1 through tubes 2.

Figure 2:
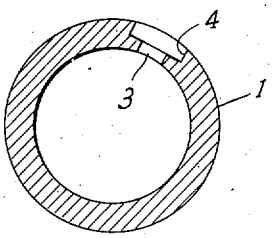
Fig. 2 is a similar sectional view showing the tube seat prior to welding.

In order to provide the juncture between the header 1 and a tube 2 the header wall is drilled clear through as shown at 3 in Fig. 2 for the inside diameter of the tube, the drilling is then counterbored as at 4 from the outside to a selected diameter and depth for receiving the end of an enveloping sleeve 5 welded to the tube 2 finished flush with the end as shown at 7 and which is further fillet welded to the tube 2 at the other end, as indicated at 8. The assembled tube 2 and sleeve 5 are then entered into the counterbore 4 to its full depth and fillet welded circumferentially as at 9.

This method of construction has several advantages, for instance, the end of tube 2 and its encompassing sleeve 5 are prepared in the shop where welding conditions are conducive to greater uniformity of product than is the case in field welding, and the danger of poor deposit or burning through the thin wall of the tube 2 are at a minimum; the finishing of the joint in the field by uniting the tube to the drum, where conditions are less uniform than in the shop, then embraces a single weld deposit 9 circumferentially of the sleeve 5 where the added thickness of metal due to the sleeve 5 and the poor thermal bond between the unwelded length of tube and sleeve produce a condition which is commensurate with welding together two pieces of greater thickness than would be the case if the tube itself were welded directly to the vessel body, and consequently greater welding heat may be used with better penetration and less danger of burning through the thinner stock.

Also for high temperature and high pressure conditions alloys are employed which, for instance, for the vessel and the tube may render it impossible or impracticable to directly unite the vessel and tube, whereas in the present construction and method the intermediate sleeve 5 may be of a metal having characteristics which render it suitable for welding both to the tube and to the vessel even though each be of different character and unsuited to each other so far as joining by fusion welding is concerned; and here again it is obvious what convenience this furnishes where, as in a steam generator, the vessel and the tube may each be formed in the shop and regardless of the suitability of the metals of the tube and vessel metals, may be satisfactorily joined in the field by fusion welding.

Thermal shock due to superheated steam entering the vessel through the tube is minimized by reason of the poor thermal juncture between the tube and sleeve and the sleeve and vessel, except at the locations where they are united by the weld deposit, and hence the joint is subjected to a less rapid flow of heat and greater uniformity with consequently less strain upon the joint at times of change in temperature.

Figure 4:
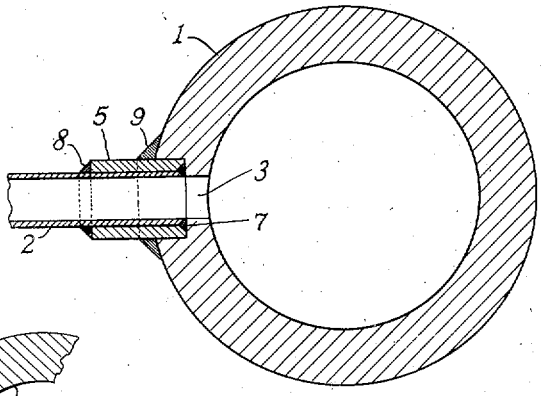
Fig. 4 is a transverse sectional view of the tube of Fig. 3 welded into the vessel.
Figure 3:
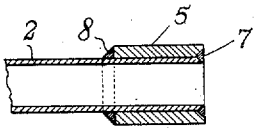
Fig. 3 is a transverse section of a shop-assembled tube end ready to be welded, in the field, to the pressure vessel.

In the modification shown in Figs. 3 and 4 which carries the same reference characters as Figs. 1 and 2 for similar parts, the tube 2 is of appreciably thinner wall than the surrounding sleeve 5 and consequently even more likely to be burned through in welding than is the case with the tube 2 of the form shown in Figs. 1 and 2, and hence there is thus an even greater advantage.

Further, it is to be noted that at the location where the weld makes the joint with the thick metal of the vessel it is not the tube 2 alone which carries the pressure of the fluid within the vessel and tube, but the tube 2 plus the sleeve 5 so that in this area, where deep fusion is required, with possibility of burning, the strength of the tube wall remains unimpaired.

Figure 5:
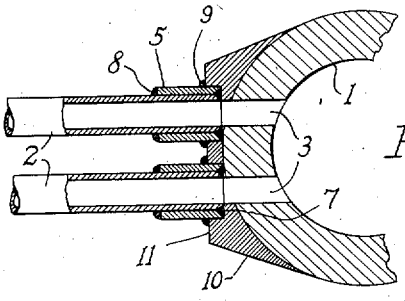
Fig. 5 is a transverse sectional view of the tube welded to the vessel where the tube-receiving portion is built up of weld deposited metal.

In the form of the invention shown in Fig. 5, the body of the vessel 1 has weld deposited thereon the additional thickness 10 subsequently machined flat on its face 11 and bored and counterbored similarly to the bore and counterbore of Fig. 2, but such that the sleeve 5 and tube 2 are seated within the added metal. The added metal may be of an alloy different from that of either vessel 1, sleeve 5 and tube 2 but readily united by fusion welding to sleeve 5 in the same manner as previously described.

The advantage of this construction is that, for instance, in the welding of 4–6 chrome steel it is necessary to preheat the steel before welding, keep the piece from cooling down after welding until placed in a furnace where it is heated up to approximately 1600° F. and furnace cooled, then heated up to 1350° F. and furnace cooled to black, so that obviously in making such a construction if it were attempted to weld 4–6 chrome tubes to a header of 4–6 chrome steel it would be an almost impossible job to accomplish this except under shop conditions, and even then it would be difficult.

In the present instance the design is so arranged that the sleeve on the ends of the 4–6 chrome tubes 2 is of carbon molybdenum steel, and which assembly, after welding, is heat treated as mentioned above. In welding to the header then under shop conditions a sufficient thickness of carbon molybdenum steel the proper heat treating may again be performed in the shop. The thickness of carbon molybdenum steel provided on the header is such that when the carbon molybdenum sleeve 5 is subsequently joined to the carbon molybdenum deposit 10 on the header, the 4–6 chrome steel of the header will then not be subjected to a temperature exceeding 950° F., which thus makes it unnecessary to subsequently heat treat the tubes and header as assembled.

While in the foregoing I have described specific embodiments of my invention for the purpose of satisfying the patent statutes, it is nevertheless to be understood that in practicing the invention I may resort to such modifications and equivalents as fall within the scope of the appended claims.

I claim:

1. In combination, a thick walled pressure vessel such as a drum or header having a wall portion providing a tube seat; a tube adapted to be fitted to the vessel at the tube seat, at least one of said elements being formed of metal having such characteristics that it is locally so hardened by air cooling after welding thereto that subsequent heat treatment is necessary if restoration of its original characteristics is to be approached; and a body of metal of different chemical constituency and having dissimilar hardening characteristics welded to the element having said characteristics and adjacent the tube seat zone before the fitting of said elements together, said body of metal providing means for connecting the elements together by a separate weld effected after the fitting of said tube to the tube seat.

2. In combination, a thick walled pressure vessel such as a drum or header having a wall portion providing a tube seat, said vessel being formed of a metal having such characteristics that it is not locally so hardened by welding metal thereto that subsequent heat treatment is necessary if restoration of its original characteristics is to be approached; a tube adapted to be fitted to the vessel at the tube seat, said tube being formed of a metal having such characteristics that it is locally so hardened by welding metal thereto that subsequent heat treatment is necessary if restoration of its original characteristics to be approached; and a body of metal of different chemical constituency than that of said tube and having dissimilar hardening characteristics welded to said tube adjacent the tube seat zone thereof and before the fitting of said tube to the tube seat of the vessel, said body of metal providing means for connecting the tube to the vessel by a separate weld effected after the fitting of said tube to the tube seat of the vessel.

3. In combination, a thick walled pressure vessel such as a drum or header having a wall portion providing a tube seat, said vessel being formed of a metal having such characteristics that it is locally so hardened by welding metal thereto that subsequent heat treatment is necessary if restoration of its original characteristics is to be approached; a tube adapted to be fitted to the vessel at the tube seat, said tube being formed of a metal having such characteristics that it is not locally so hardened by welding metal thereto that subsequent heat treatment is necessary if restoration of its original characteristics is to be approached; and a body of metal of different chemical constituency than that of said vessel and having dissimilar hardening characteristics welded to said vessel adjacent the tube seat zone thereof and before the fitting of said tube to the tube seat of the vessel, said body of metal providing means for connecting the tube to the vessel by a separate weld effected after the fitting of said tube to the tube seat of the vessel.

4. The method of welding together two pieces of metal, at least one of which is subject to change in its physical properties adjacent the weld by the welding operation, which comprises welding an extension of metal which is not subject to such change to the edge of said piece subject to change to protect the latter from undergoing changes in physical properties as a result of subsequent welding operations, heat treating the composite piece to provide the desired physical properties in the metal thereof, and subsequently welding said pieces together with said added metal between the weld and the original piece subject to change.

5. The method of welding together two pieces of metal, at least the first of which is subject to change in its physical properties adjacent the weld by the welding operation, which comprises fusion depositing a body of weld metal not subject to such change on said first piece subject to change to protect the latter from undergoing changes in physical properties as a result of subsequent welding operations, heat treating the composite piece to provide the desired physical properties in the metal thereof, and subsequently welding said pieces together with said added metal between the weld and the original piece subject to change, the thickness of said body of weld metal being such that the heat conducted therethrough during the final welding will not so raise the temperature of the first piece that heat treatment is required.

6. The method of welding to a pressure vessel a tube which is subject to such change in its physical properties adjacent the weld by the welding operation that heat treatment is required, which comprises welding an extension of metal which is not subject to such change to the tube to protect the latter from undergoing changes in physical properties as a result of subsequent welding operations, heat treating the composite tube and extension to provide the desired physical properties in the metal thereof, and subsequently welding said pressure vessel and tube together with said extension between the weld and the original piece subject to change.

HOWARD J. KERR.